(12) United States Patent
Hirayama et al.

(10) Patent No.: US 7,776,935 B2
(45) Date of Patent: *Aug. 17, 2010

(54) WATER-IN-OIL EMULSION COMPOSITION FOR FORMING SILICONE ELASTOMER POROUS MATERIAL

(75) Inventors: Naka Hirayama, Shizuoka-Ken (JP); Atsushi Ikeda, Shizuoka-Ken (JP)

(73) Assignee: Nitto Kogyo Co., Ltd., Tokyo (JP)

( * ) Notice: Subject to any disclaimer, the term of this patent is extended or adjusted under 35 U.S.C. 154(b) by 787 days.

This patent is subject to a terminal disclaimer.

(21) Appl. No.: 11/730,980

(22) Filed: Apr. 5, 2007

(65) Prior Publication Data

US 2007/0179209 A1    Aug. 2, 2007

Related U.S. Application Data

(62) Division of application No. 10/986,659, filed on Nov. 12, 2004, now Pat. No. 7,285,578.

(30) Foreign Application Priority Data

Nov. 20, 2003    (JP)    ............... 2003-391144

(51) Int. Cl.
*C08G 77/00* (2006.01)
*C08J 9/28* (2006.01)

(52) U.S. Cl. ............... 521/154; 521/65; 521/86

(58) Field of Classification Search ............ 521/65, 521/86, 154

See application file for complete search history.

(56) References Cited

U.S. PATENT DOCUMENTS

| 5,599,533 A | 2/1997 | Stepniewski et al. |
| 5,804,607 A | 9/1998 | Hedrick et al. |
| 2005/0143480 A1 | 6/2005 | Hirayama et al. |

FOREIGN PATENT DOCUMENTS

| JP | 6-287348 | 10/1994 |
| JP | 2003226774 A | 8/2003 |

OTHER PUBLICATIONS

Chinese Office Action dated Mar. 8, 2010, issued in corresponding Chinese Patent Application No. 200710169257.

*Primary Examiner*—Milton I Cano
*Assistant Examiner*—Gennadiy Mesh
(74) *Attorney, Agent, or Firm*—Westerman, Hattori, Daniels & Adrian, LLP

(57) ABSTRACT

A method for preparing a silicone elastomer porous material includes the steps of (1) providing a water-in-oil emulsion including a liquid silicone rubber material which forms a silicone elastomer upon curing, a silicone oil material that has a surface activation function, and water droplets dispersed in the liquid silicone rubber material, (2) subjecting the emulsion to a primary heating, thereby curing the liquid silicone rubber material to form a silicone elastomer and confining the water droplets within the silicone elastomer substantially as they are present in the emulsion, and (3) subjecting the silicone elastomer to a secondary heating, thereby evaporating and removing the water droplets from the silicone elastomer, thereby forming the silicone elastomer porous material.

11 Claims, 5 Drawing Sheets

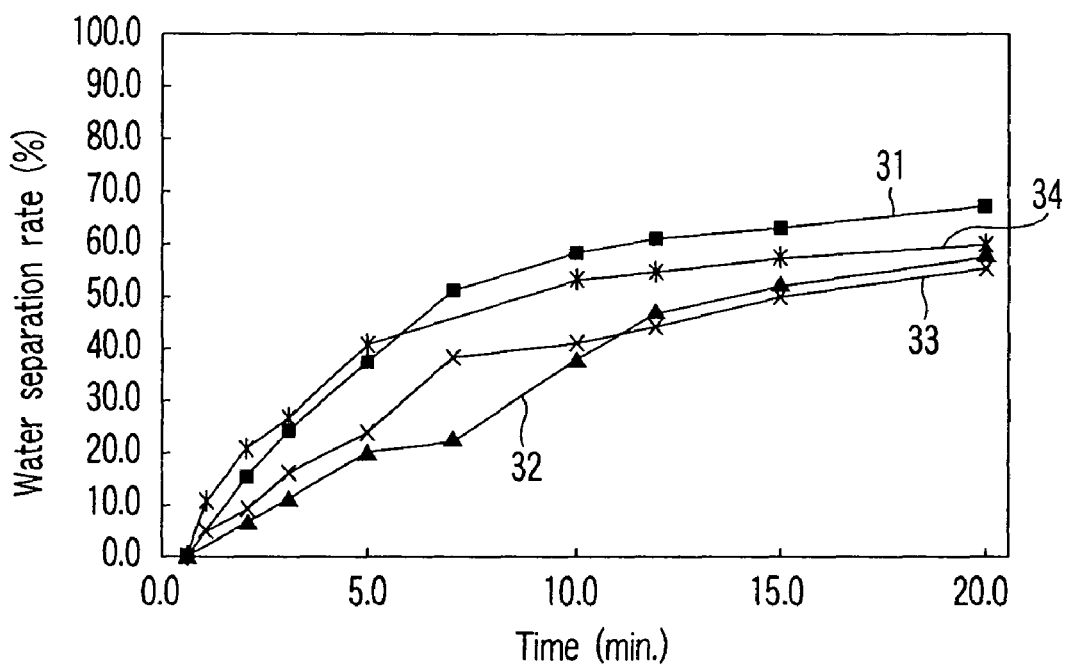
F I G. 7
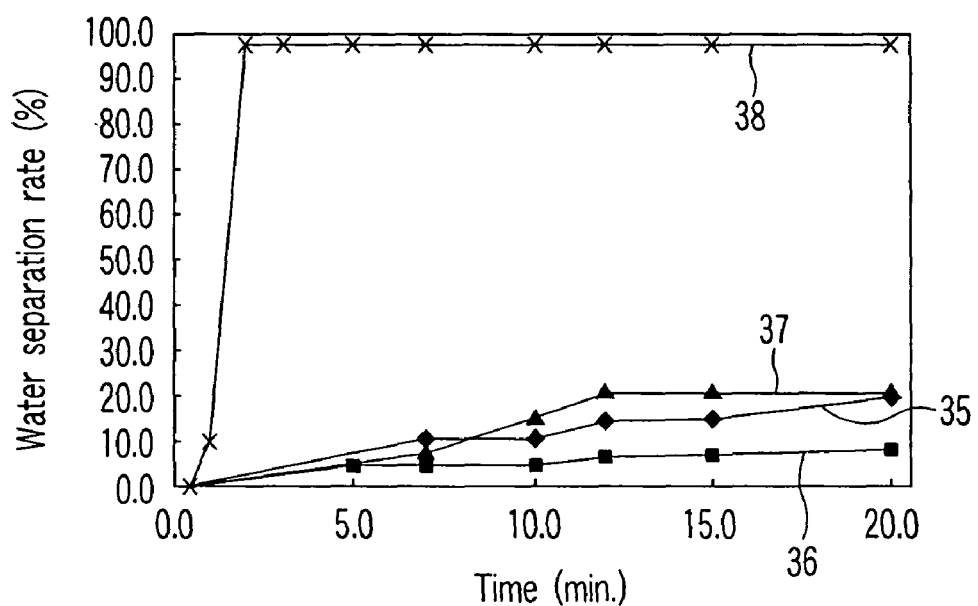
F I G. 8

WATER-IN-OIL EMULSION COMPOSITION FOR FORMING SILICONE ELASTOMER POROUS MATERIAL

CROSS-REFERENCE TO RELATED APPLICATIONS

This application is a divisional application of U.S. Application Ser. No. 10/986,659 filed on Nov. 12, 2004, which is based upon and claims the benefit of priority from prior Japanese Patent Application No. 2003-391144, filed Nov. 20, 2003, the entire contents of which are incorporated herein by reference.

BACKGROUND OF THE INVENTION

1. Field of the Invention

The present invention relates to a water-in-oil emulsion composition for forming a silicone elastomer porous material, and more specifically to a water-in-oil emulsion composition which can produce a silicone elastomer porous material without being accompanied by a foaming phenomenon.

2. Description of the Related Art

Silicone elastomer porous materials are used in a variety of fields, for example, as parts of image forming devices such as photocopiers and laser printers, including developing rollers, toner feeding rollers, transfer rollers and drum cleaning rollers, as sheet feeding rollers of photocopiers, various types of printers and plotters, and as pressure rollers of fixing devices.

Conventionally, porous materials are produced mainly by utilizing foaming phenomenon. For foaming, a chemical foaming agent, a gas or water has been used as a foaming agent. The manufacture of silicone elastomer porous materials is not exception, and in most cases, silicone elastomer porous materials have been prepared by using one of these foaming agents. However, in such a conventional method of producing a silicone elastomer porous material, curing of silicone rubber and foaming are effected at simultaneously, with the result that cells (pores) in the resultant porous material are not uniform in size and their sizes vary in a wide range. Further, it is conventionally difficult to form cells having a size as small as, for example, 20 μm or less.

On the other hand, Jpn. Pat. Appln. KOKAI Publication No. 6-287348 discloses a method of producing a silicone elastomer porous material by freezing a room-temperature curing polysiloxane emulsion containing a polysiloxane having a silanol group, a specific crosslinking agent, a curing catalyst, and an emulsifying agent by refrigeration and sublimating the water to dry the frozen emulsion without defrosting it. Even with this method, it is still difficult to produce a porous material having uniform and fine cells. Further, the porous material obtained by this method is of an open cell type.

BRIEF SUMMARY OF THE INVENTION

An object of the present invention is to provide a water-in-oil emulsion composition from which a silicone elastomer porous material having even and fine-sized cells (pores) can be produced without being accompanied by a foaming phenomenon.

According to an aspect of the present invention, there is provided a water-in-oil emulsion composition for forming a silicone elastomer porous material, comprising a liquid silicone rubber material which forms a silicone elastomer upon curing, a silicone oil material which has a surface activation function, and water.

BRIEF DESCRIPTION OF THE SEVERAL VIEWS OF THE DRAWING

FIG. 7 is a graph showing the water separation ratio of each of emulsions prepared in Experiment 6, which will be explained below in detail;

FIG. 8 is a graph showing the water separation ratio of each of emulsions prepared in Experiment 7, which will be explained below in detail;

DETAILED DESCRIPTION OF THE INVENTION

Figure 1:
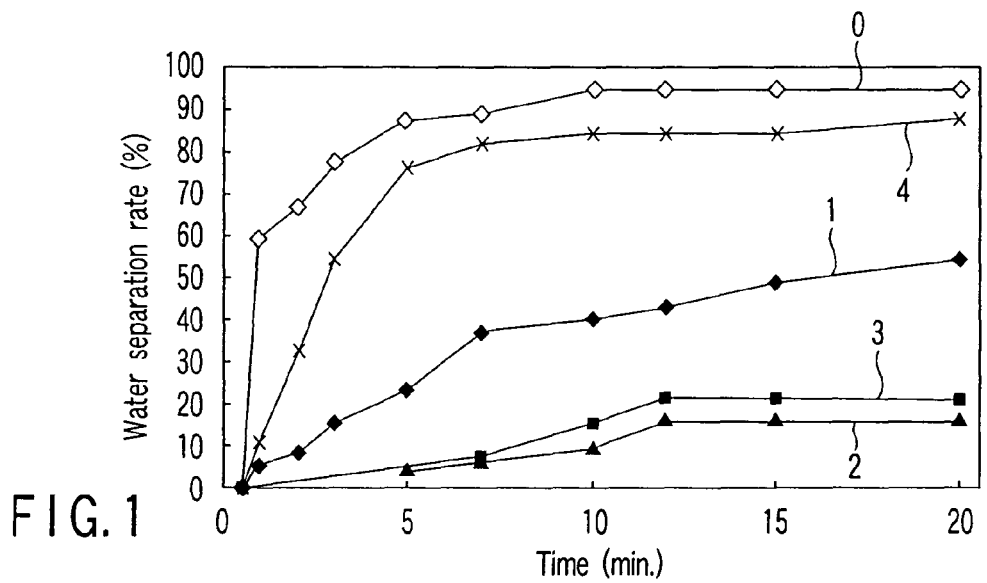
FIG. 1 is a graph showing the water separation ratio of each of emulsions prepared in Experiment 1, which will be explained below in detail.

A water-in-oil emulsion composition according to the present invention comprises a liquid silicone rubber material which forms a silicone elastomer upon curing, a silicone oil material which has a surface activation function, and water.

The liquid silicone rubber material is not particularly limited as long as it forms a silicone elastomer upon curing by heating; however, it is preferable to use a so-called addition reaction curing liquid silicone rubber. The addition reaction curing liquid silicone rubber contains a polysiloxane having unsaturated aliphatic group or groups, acting as a main agent, and an active hydrogen-containing polysiloxane acting as a crosslinking agent. In a polysiloxane having unsaturated aliphatic groups, the unsaturated aliphatic group is introduced at the respective terminals of the molecule, and they can be introduced as side chains as well. Such a polysiloxane having the unsaturated aliphatic groups can be represented by, for example, the following formula (1):

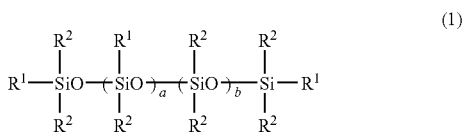

(1)

In the formula (1), each $R^1$ represents an unsaturated aliphatic group, and each $R^2$ represents a $C_1$-$C_4$ lower alkyl group, a fluorine-substituted $C_1$-$C_4$ lower alkyl group or a phenyl group. The sum of a and b is usually 50 to 2,000. The unsaturated aliphatic group represented by $R^1$ is usually vinyl group. $R^2$ is usually methyl group.

The active hydrogen-containing polysiloxane (hydrogen polysiloxane) serves as a crosslinking agent for the polysiloxane having unsaturated aliphatic groups, and has a hydrogen atom (active hydrogen) bonded to a silicon atom in its main chain. It is preferable that three or more hydrogen atoms is present per molecule of the active hydrogen-containing polysiloxane. Such an active hydrogen-containing polysiloxane can be represented by, for example, the following formula (2):

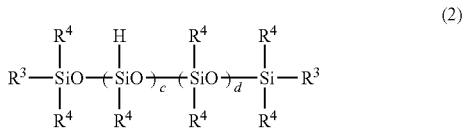

(2)

In the formula (2), each $R^3$ represents hydrogen or a $C_1$-$C_4$ lower alkyl group, and each $R^4$ represents a $C_1$-$C_4$ lower alkyl group. The sum of c and d is usually 8 to 100. The lower alkyl groups represented by $R^3$ and $R^4$ are usually methyl groups.

These liquid silicone rubber materials are commercially available. It should be noted that as the products on the market, the polysiloxane containing unsaturated aliphatic groups, constituting an addition reaction curing liquid silicone rubber, and the active hydrogen-containing polysiloxane are provided in separate packages, and a curing catalyst necessary to cure both of these polysiloxanes, which will be later described in detail, is added to the active hydrogen-containing polysiloxane package.

The silicone oil material having a surface activation function serves as a dispersion stabilizer for stably dispersing water in emulsion. Thus, the silicone oil material having a surface activation function exhibits an affinity for water as well as for the liquid silicone rubber material. It is preferable that this silicone oil material has a hydrophilic group such as an ether group. Further, the silicone oil material exhibits an HLB value of usually 3 to 13, preferably 4 to 11. More preferably, two ether-modified silicone oils having HLB values different from each other by 3 or more are used in combination. In this case, still more preferably, a first ether-modified silicone oil having an HLB value of 7 to 11 and a second ether-modified silicone oil having an HLB value of 4 to 7 are used in combination. Either one of the ether-modified silicone oils may be of a type in which a polyether group is introduced at a side chain of the polysiloxane, which can be represented by, for example, the following formula (3):

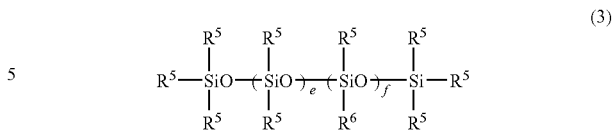

(3)

In the formula (3), each $R^5$ represents a $C_1$-$C_4$ lower alkyl group, and $R^6$ represents a polyether group. The sum of e and f is usually 8 to 100. The lower alkyl group represented by each $R^5$ is usually a methyl group. Further, the polyether group represented by $R^6$ usually includes $(C_2H_4O)_x$ group, $(C_3H_6O)_y$ group or $(C_2H_4O)_x(C_3H_6O)_y$ group. The HLB value is determined mainly by the values of x and y. These liquid silicone oil materials having a surface activation function are commercially available.

Needless to say, in the water-in-oil emulsion of the present invention, water is dispersed in the form of particles (droplets) as a discontinuous phase. As will be described later in detail, the diameter of droplets of water substantially determines the diameter of the cells (pores) of the porous material obtained from the water-in-oil emulsion of the present invention. Water can exist in the form of droplets having an average diameter of 1 to 50 μm. Especially, in the water-in-oil emulsion of the present invention, water droplets having a diameter of 20 μm or less can exist to occupy 90% or more of all the water droplets. The size of water droplets in the emulsion can be measured by microscopic observation.

In order to cure the liquid silicone rubber material, the water-in-oil emulsion of the present invention may contain a curing catalyst. As the curing catalyst, a platinum catalyst can be employed as is known in the art. It suffices that the amount of the platinum catalyst is about 1 to 100 ppm by weight in terms of platinum atom. The curing catalyst may be added to the water-in-oil emulsion of the present invention when producing a silicone elastomer porous material, or it may be blended when preparing the emulsion.

In order to obtain a water-in-oil emulsion with a particularly excellent water dispersion stability, it is preferable that 0.2 to 5.5 parts by weight of the silicone oil material having a surface activation function, and 10 to 250 parts by weight of water are used based on 100 parts by weight of the liquid silicone rubber material. In the case where the silicone oil material having a surface activation function is composed of a combination of the first ether-modified silicone oil and the second ether-modified oil, described above, it is preferable that 0.15 to 3.5 parts by weight of the first ether-modified silicone oil and 0.05 to 2 parts by weight of the second ether-modified silicone oil (a total of 0.2 to 5.5 parts by weight) are used based on 100 parts by weight of the liquid silicone rubber material. In the case where the liquid silicone rubber material is composed of a combination of a polysiloxane having unsaturated aliphatic groups and an active hydrogen-containing polysiloxane, the ratio between the former and latter in weight is preferably 6:4 to 4:6.

The water-in-oil emulsion of the present invention may contain various types of additives depending on the use of the porous material obtained therefrom. Examples of the additives are colorants (such as pigments and dyes), electrical conductivity-imparting agents (such as carbon black and metal powder) and fillers (such as silica). Further, the water-in-oil emulsion of the present invention may contain a low molecular-weight, non-reactive silicone oil in order to adjust the viscosity of the emulsion for the purpose of, for example, easily performing defoaming of the emulsion. When the water-in-oil emulsion of the present invention has a viscosity of 1 cSt to 200,000 cSt, it can be easily defoamed and therefore it can be handled conveniently.

The water-in-oil emulsion of the present invention can be prepared by various methods. In general, it can be prepared by mixing the liquid silicone material, silicone oil material having a surface activation function and water together with an additive if necessary, and stirring the mixture sufficiently. In the case where the liquid silicone rubber material is provided by a combination of the polysiloxane containing unsaturated aliphatic groups and the active hydrogen-containing polysiloxane, the polysiloxane containing unsaturated aliphatic groups and a portion of the silicone oil material having a surface activation function can be mixed together and stirred to obtain a first mixture, whereas the active hydrogen-containing polysiloxane and the rest of the silicone oil material having a surface activation function can be mixed together and stirred to obtain a second mixture. Subsequently, while mixing and stirring the first mixture and the second mixture, water can be gradually added thereto, and the mixture can be stirred to prepare a desired emulsion. Needless to say, the method of preparing the water-in-oil emulsion of the present invention is not limited to the above one. The order of addition of the liquid silicone rubber material, silicone oil material having a surface activation function, water and additives that might be added as needed may be arbitrary. The stirring for forming the emulsion can be carried out using an agitator at a rotation speed of, for example, 300 rpm to 1,000 rpm. After the formation of the emulsion, the emulsion can be subjected to a defoaming process without heating it, using, for example, a vacuum decompressor, so as to remove the air present in the emulsion.

In order to produce a silicone elastomer porous material using the water-in-oil emulsion of the present invention, the water-in-oil emulsion of the present invention is subjected to a heat curing (primary heating) condition for the liquid silicone rubber material in the presence of a curing catalyst. In the primary heating, it is preferable to use a heating temperature of 130° C. or less in order to thermally cure the liquid silicone rubber material without evaporating the water in the emulsion. The heating temperature for the primary heating is usually 80° C. or higher, and the heating time is usually about 5 minutes to 60 minutes. By this primary heating, the liquid silicone rubber is cured, and confines the water droplets in the emulsion as they are present in the emulsion. The cured silicone rubber is cured to such a degree that it can withstand the expanding force exerted by the water when the water is evaporated by a secondary heating, which will be described below.

Next, in order to remove the water from the cured silicone rubber confining the water droplets therein, a secondary heating is carried out. The secondary heating is preferably carried out at a temperature of 70° C. to 300° C. If the heating temperature is lower than 70° C., it would take an excessively long time to remove the water, whereas if the temperature exceeds 300° C., the cured silicone rubber may be degraded. With the heating temperature of 70° C. to 300° C., the water is removed by evaporation within 1 to 24 hours. By the secondary heating, the water content is removed by evaporation, and further the final curing of the silicone rubber material can be effected. The water removed by evaporation leave cells having a diameter substantially the same as that of the water droplets, in the cured silicone rubber material (silicone elastomer).

In this way, the water-in-oil emulsion of the present invention can produce a silicone elastomer without being accompanied by a foaming phenomenon. The water droplets within the emulsion are confined in the cured silicone rubber by the primary heating, and then they simply evaporate in the secondary heating. In this manner, a substantially closed-cell silicone elastomer porous material can be obtained. The porous material obtained is very fine in cells (pores) and has a narrow distribution of cell sizes, and thus the cells are highly uniform. The silicone elastomer porous material produced from the water-in-oil emulsion of the present invention can be utilized in various fields. For example, the porous material can be used as parts of image forming devices such as photocopiers and laser printers, including developing rollers, toner feeding rollers, transfer rollers and drum cleaning rollers, as sheet feeding rollers of photocopiers, various types of printers and plotters, and as pressure rollers of fixing devices.

The present invention is further described below by way of its Examples, but the invention is not limited to these Examples.

First, for the purpose of obtaining the optimal ratio between the liquid silicone rubber material, silicone oil material having a surface activation function (a dispersion stabilizer for water) and water, in order to prepare a water-in-oil emulsion excellent in water dispersibility, the following Experiments 1 to 5 were carried out. Further, for the purpose of obtaining the optimal HLB value of the dispersion stabilizer, the following Experiments 6 to 9 were carried out.

Since the liquid silicone rubber material used in the present invention cures, dimethylsilicone oil (KF-96 available from Shin-Etsu Chemical Co., Ltd (viscosity: 100 cSt)), which is non-reactive (non-curable) straight silicone oil that has a chemical structure similar to that of the curable liquid silicone rubber, was used in Experiments 1 to 9 in place of this curable liquid silicone rubber for ease of handling.

In Experiments 1 to 5, two types of polyether-modified silicone oils (KF-618 available from Shin-Etsu Chemical Co., Ltd (HLB value: 11); "dispersion stabilizer I" in Experiments 1 to 5) and (KF-6015 available from the same company (HLB value: 4); "dispersion stabilizer II" in Experiments 1 to 5) were used as the dispersion stabilizer.

On the other hand, in Experiments 6 to 9, the aforementioned KF-6015 (HLB value: 4; "dispersion stabilizer A" in Experiments 6 to 9), KF-352 (HLB value: 7; "dispersion stabilizer B" in Experiments 6 to 9), KF-353 (HLB value: 10; "dispersion stabilizer C" in Experiments 6 to 9), the aforementioned KF-618 (HLB value: 11; "dispersion stabilizer D" in Experiments 6 to 9), and KF-354L (HLB value: 16; "dispersion stabilizer E" in Experiments 6 to 9), which are polyether-modified silicone oils available from Shin-Etsu Chemical Co., Ltd, were used as the dispersion stabilizers.

According to the product catalog, all of these polyether-modified silicone oils have a structure represented by the above formula (3) in which each $R^5$ is a methyl group, and $R^6$ has $(C_2H_4O)_x(C_3H_6O)_y$ group as a polyether group.

PROCEDURES OF EXPERIMENTS

Water, dimethylsilicone oil and two dispersion stabilizers are gently poured into a predetermined container in this order, and allowed to stand still for a predetermined time. The water, the dimethylsilicone oil and the dispersion stabilizers are separated into three layers, and the thickness $t_1$ of the water layer is measured. Next, the contents in the container are stirred with a hand mixer to form an emulsion. After the formation of the emulsion, the emulsion is allowed to stand still, during which the thickness $t_2$ of the layer of water separated from the emulsion is measured for every predetermined time elapse. The rate of separation of water (water separation rate) (%) is calculated from the equation: $(t_2/t_1) \times 100$. As evaluation, cases where the water separation rate after 20 minutes satisfies a criterion of 50% or less are indicated by ○, whereas cases where it does not satisfy the standard are indicated by X. In consideration of the time required for the emulsion to be stable after being formed until poured into a mold, it is preferable that the water separation rate of the emulsion from the time when it is formed until an lapse of time of 20 minutes is 50% or less. Such a stable emulsion can stably produce a silicone elastomer porous material of a higher quality.

It should be noted that in FIGS. 1 to 9, which show the results of Experiments 1 to 9, the numeral added to the respective curve indicates the Formulation number in the respective Experiment. For example, the result of Formulation 1 is indicated by Curve 1. Further the composition of each Formulation is based on parts by weight.

Experiment 1

As shown in Table 1 below, various emulsions (Formulations 1-4) were prepared in which the ratio between dispersion stabilizer I and dispersion stabilizer II was varied while fixing the total amount of these at constant, with the ratio and the total amount of dimethylsilicone oil and water fixed at constant. For each emulsion, the water separation rate was measured at various lapses of times. The water separation rate was also measured on an emulsion (Formulation 0) that was prepared without using any dispersion stabilizers. The results are shown in Table 2 below and FIG. 1, and the results of evaluation are shown also in Table 1. It should be noted that in Formulation 5, a portion of the oil gelled. In Table 2, the symbol "*" indicates that the boarder of the separated water layer was not clear (same applies to Tables 4, 6, 8, 10, 13, 15 and 17 below.)

From the results shown in Table 1 and FIG. 1, it can be understood that in the case where dimethylsilicone oil and water are used at a ratio of 50:50, an emulsion with a desirable water dispersion stability can be obtained if the ratio between dispersion stabilizer I and dispersion stabilizer II is 5:5 to 7:3.

TABLE 1

Compositions of Formulations 0-5 and the Results of Evaluation

|  | Form. 0 | Form. 1 | Form. 2 | Form. 3 | Form. 4 | Form. 5 |
|---|---|---|---|---|---|---|
| Dimethyl-silicone oil | 50 | 50 | 50 | 50 | 50 | 50 |
| Water | 50 | 50 | 50 | 50 | 50 | 50 |
| Dispersion stabilizer I | 0 | 1 | 0.7 | 0.5 | 0.3 | 0 |
| Dispersion stabilizer II | 0 | 0 | 0.3 | 0.5 | 0.7 | 1 |
| Evaluation | X | X | ○ | ○ | X | X |

TABLE 2

Water Separation Rates of Formulations 0-4

| | Water Separation Rate (%) | | | | | | | | | |
|---|---|---|---|---|---|---|---|---|---|---|
| | After 0.5 min. | After 1 min. | After 2 min. | After 3 min. | After 5 min. | After 7 min. | After 10 min. | After 12 min. | After 15 min. | After 20 min. |
| Form. 0 | 0.0 | 59.6 | 67.7 | 78.5 | 87.8 | 89.4 | 94.8 | 94.8 | 94.8 | 94.8 |
| Form. 1 | 0.0 | 5.5 | 9.8 | 16.4 | 24.6 | 38.3 | 41.0 | 43.8 | 49.2 | 54.7 |
| Form. 2 | 0.0 | * | * | * | 5.5 | 8.2 | 10.9 | 16.4 | 16.4 | 16.4 |
| Form. 3 | 0.0 | * | * | * | * | 8.2 | 16.4 | 21.9 | 21.9 | 21.9 |
| Form. 4 | 0.0 | 10.9 | 32.8 | 54.7 | 76.6 | 82.1 | 84.8 | 84.8 | 84.8 | 87.5 |

Experiment 2

Figure 2:
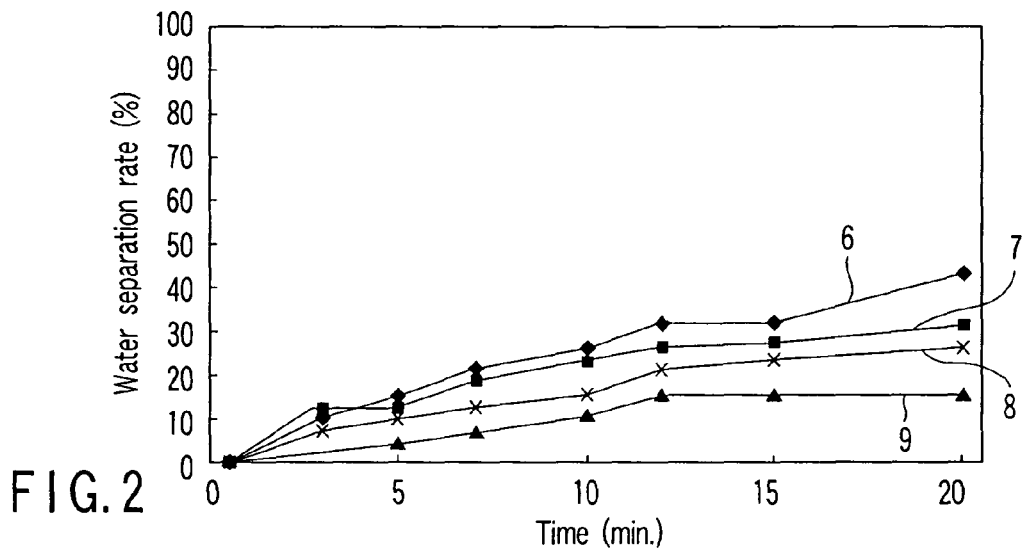
FIG. 2 is a graph showing the water separation ratio of each of emulsions prepared in Experiment 2, which will be explained below in detail.
Figure 3:
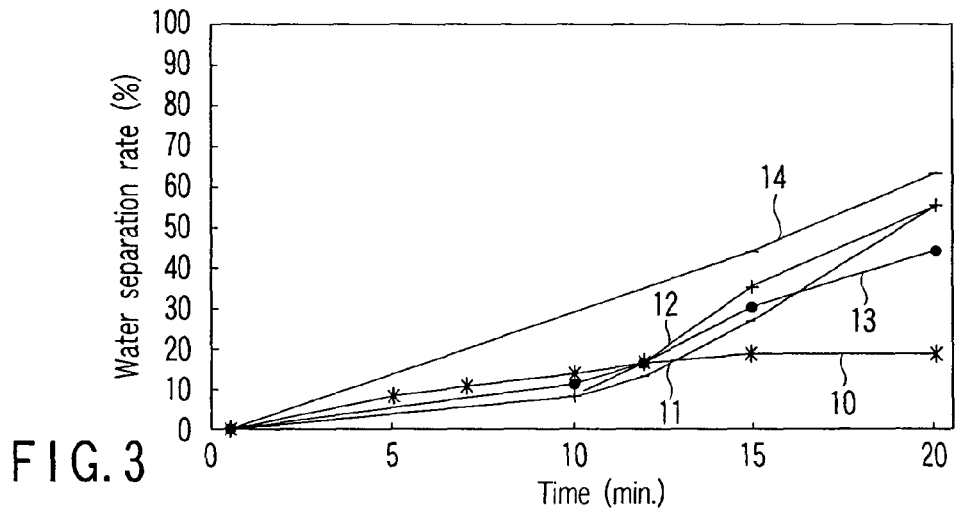
FIG. 3 is a graph showing the water separation ratio of each of emulsions prepared in Experiment 2, which will be explained below in detail.

As shown in Table 3 below, various emulsions (Formulations 6-14) were prepared in which the total amount of dispersion stabilizer I and stabilizer II was varied while fixing the ratio between these at constant, with the ratio and the total amount of dimethylsilicone oil and water fixed at constant. For each emulsion, the water separation rate was measured. The results are shown in Table 4 below. The results of Formulations 6 to 9 are also shown in FIG. 2 and those of Formulations 10 to 14 are also shown in FIG. 3. The evaluation of each of the emulsions is indicated also in Table 3.

From the results shown in Table 3 and FIGS. 2 to 3, it can be understood that Formulations 7 to 10 produce emulsions with a desirable water dispersion stability.

TABLE 3

Compositions of Formulations 6-14 and the Results of Evaluation

|  | Blend 6 | Blend 7 | Blend 8 | Blend 9 | Blend 10 | Blend 11 | Blend 12 | Blend 13 | Blend 14 |
|---|---|---|---|---|---|---|---|---|---|
| Dimethyl-silicone oil | 50 | 50 | 50 | 50 | 50 | 50 | 50 | 50 | 50 |
| Water | 50 | 50 | 50 | 50 | 50 | 50 | 50 | 50 | 50 |
| Dispersion stabilizer I | 0.175 | 0.35 | 0.525 | 0.7 | 1.4 | 3.5 | 7 | 14 | 21 |
| Dispersion stabilizer II | 0.075 | 0.15 | 0.225 | 0.3 | 0.6 | 1.5 | 3 | 6 | 9 |
| Total amount of Dispersion stabilizers | 0.25 | 0.5 | 0.75 | 1 | 2.0 | 5 | 10 | 20 | 30 |
| Evaluation | X | ◯ | ◯ | ◯ | ◯ | X | X | X | X |

TABLE 4

Water Separation Rates of Formulations 6-14

| | Water Separation Rate (%) | | | | | | | |
|---|---|---|---|---|---|---|---|---|
| | After 0.5 min. | After 3 min. | After 5 min. | After 7 min. | After 10 min. | After 12 min. | After 15 min. | After 20 min. |
| Form. 6 | 0.0 | 10.9 | 16.4 | 21.9 | 27.4 | 32.8 | 32.8 | 43.8 |
| Form. 7 | 0.0 | 13.7 | 13.7 | 19.1 | 24.6 | 27.4 | 28.4 | 32.8 |
| Form. 8 | 0.0 | 8.2 | 10.9 | 13.7 | 16.4 | 21.9 | 24.6 | 27.4 |
| Form. 9 | 0.0 | * | 5.5 | 8.2 | 10.9 | 16.4 | 16.4 | 16.4 |
| Form. 10 | 0.0 | * | 8.2 | 10.7 | 13.7 | 16.4 | 19.1 | 19.1 |
| Form. 11 | 0.0 | * | * | * | 10.9 | 16.4 | 30.1 | 43.8 |
| Form. 12 | 0.0 | * | * | * | 8.2 | 16.4 | 35.6 | 54.7 |
| Form. 13 | 0.0 | * | * | * | 8.2 | 13.7 | 27.4 | 54.7 |
| Form. 14 | 0.0 | * | * | * | * | * | 43.8 | 62.9 |

Experiment 3

As shown in Table 5 below, various emulsions (Formulations 15-19) were prepared in which the ratio between dimethylsilicone oil and water was varied while fixing the total amount of these was fixed at constant, with the ratio and the total amount of dispersion stabilizer I and stabilizer II fixed at constant. For each emulsion, the water separation rate was measured. The results are shown in Table 6 below and FIG. 4. The evaluation of each of the emulsions is shown also in Table 5.

Figure 4:
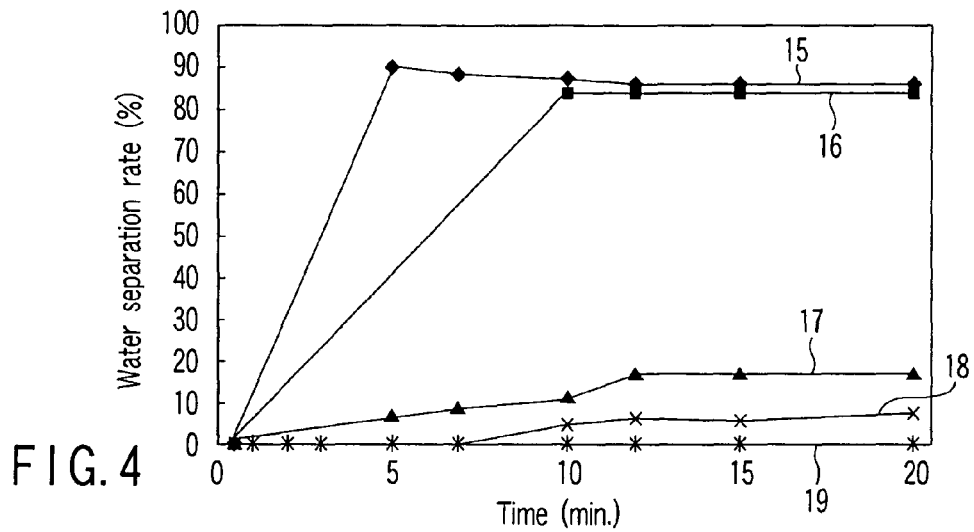
FIG. 4 is a graph showing the water separation ratio of each of emulsions prepared in Experiment 3, which will be explained below in detail.

From the results shown in Table 6 and FIG. 4, it can be understood that as the ratio of water is higher, the dispersion property of water is lowered. It can be further understood that Formulations 17 to 19 produce emulsions with a desirable water dispersion stability.

TABLE 5

Compositions of Formulations 15-19 and the Results of Evaluation

|  | Form. 15 | Form. 16 | Form. 17 | Form. 18 | Form. 19 |
|---|---|---|---|---|---|
| Dimethyl-silicone oil | 10 | 30 | 50 | 70 | 90 |
| Water | 90 | 70 | 50 | 30 | 10 |
| Dispersion stabilizer I | 0.7 | 0.7 | 0.7 | 0.7 | 0.7 |
| Dispersion stabilizer II | 0.3 | 0.3 | 0.3 | 0.3 | 0.3 |
| Evaluation | X | X | ◯ | ◯ | ◯ |

TABLE 6

Water Separation Rates of Formulations 15-19

| | Water Separation Rate (%) | | | | | | | | | |
|---|---|---|---|---|---|---|---|---|---|---|
| | After 0.5 min. | After 1 min. | After 2 min. | After 3 min. | After 5 min. | After 7 min. | After 10 min. | After 12 min. | After 15 min. | After 20 min. |
| Form. 15 | 0.0 | * | * | * | 109.2 | 99.5 | 98.5 | 97.0 | 96.4 | 96.4 |
| Form. 16 | 0.0 | * | * | * | * | * | 84.8 | 84.8 | 84.8 | 84.8 |

TABLE 6-continued

Water Separation Rates of Formulations 15-19

| | Water Separation Rate (%) | | | | | | | | | |
|---|---|---|---|---|---|---|---|---|---|---|
| | After 0.5 min. | After 1 min. | After 2 min. | After 3 min. | After 5 min. | After 7 min. | After 10 min. | After 12 min. | After 15 min. | After 20 min. |
| Form. 17 | 0.0 | * | * | * | 5.5 | 8.2 | 10.9 | 16.4 | 16.4 | 16.4 |
| Form. 18 | 0.0 | * | * | * | * | * | 3.9 | 5.8 | 5.8 | 7.7 |
| Form. 19 | 0.0 | 0.0 | 0.0 | 0.0 | 0.0 | 0.0 | 0.0 | 0.0 | 0.0 | 0.0 |

Experiment 4

As shown in Table 7 below, a formulation (Formulation 22) in which the ratio between water and dimethylsilicone oil was 50:50 and the ratio between dispersion stabilizer I and dispersion stabilizer II was 0.7:0.3 was prepared as a standard. Based on this standard, the ratio between water and dimethylsilicone oil was varied, and further the amount of dispersion stabilizer I was increased or reduced in accordance with an increase or decrease in the amount of water, respectively, and the amount of dispersion stabilizer II was increased or reduced in accordance with an increase or decrease in the amount of dimethylsilicone oil, respectively, to prepare various emulsions. For each emulsion, the water separation rate was measured. The results are shown in Table 8 below and FIG. 5. The evaluation of each of the emulsions is shown also in Table 7.

Figure 5:
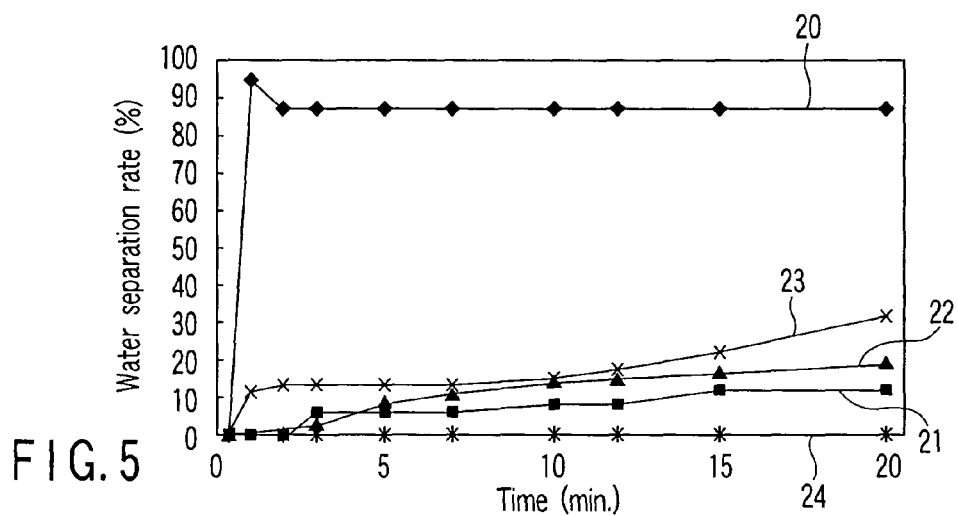
FIG. 5 is a graph showing the water separation ratio of each of emulsions prepared in Experiment 4, which will be explained below in detail.

From the results shown in Table 8 and FIG. 5, it can be understood that Formulations 21 to 24 produce emulsions with a desirable water dispersion stability.

Experiment 5

As shown in Table 9 below, various emulsions (Formulations 25-29) were prepared in which the ratio between dimethylsilicone oil and water was varied while fixing the total amount of these at constant, and the amount of dispersion stabilizer I was changed in accordance with an increase or decrease in amount of water, with the ratio between dispersion stabilizer I and stabilizer II fixed at constant. For each emulsion, the water separation rate was measured. The results are shown in Table 10 below and FIG. 6. The evaluation of each of the emulsions is shown also in Table 9.

Figure 6:
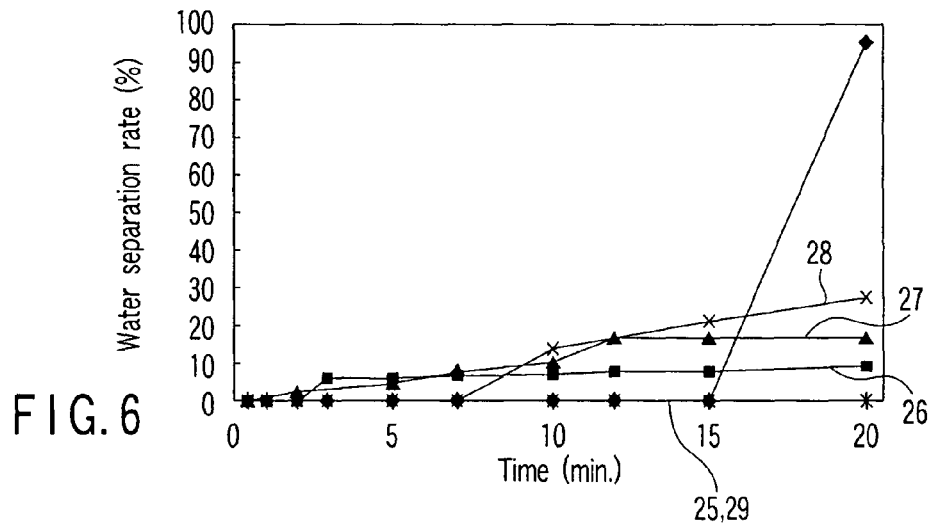
FIG. 6 is a graph showing the water separation ratio of each of emulsions prepared in Experiment 5, which will be explained below in detail.

From the results shown in Table 10 and FIG. 6, it can be understood that as the ratio of water is higher, the dispersion property of water is lowered. It can be further understood that Formulations 26 to 29 produce emulsions with a desirable water dispersion stability.

TABLE 7

Compositions of Formulations 20-24 and the Results of Evaluation

| | Form. 20 | Form. 21 | Form. 22 | Form. 23 | Form. 24 |
|---|---|---|---|---|---|
| Dimethylsilicone oil | 10 | 30 | 50 | 70 | 90 |
| Water | 90 | 70 | 50 | 30 | 10 |
| Dispersion stabilizer I | 1.26 | 0.98 | 0.7 | 0.42 | 0.14 |
| Dispersion stabilizer II | 0.06 | 0.18 | 0.3 | 0.42 | 0.54 |
| Evaluation | X | ○ | ○ | ○ | ○ |

TABLE 9

Compositions of Formulations 25-29 and the Results of Evaluation

| | Form. 25 | Form. 26 | Form. 27 | Form. 28 | Form. 29 |
|---|---|---|---|---|---|
| Dimethylsilicone oil | 10 | 30 | 50 | 70 | 90 |
| Water | 90 | 70 | 50 | 30 | 10 |
| Dispersion stabilizer I | 1.26 | 0.98 | 0.7 | 0.42 | 0.14 |
| Dispersion stabilizer II | 0.54 | 0.42 | 0.3 | 0.18 | 0.06 |
| Evaluation | X | ○ | ○ | ○ | ○ |

TABLE 8

Water Separation Rates of Formulations 20-24

| | Water Separation Rate (%) | | | | | | | | | |
|---|---|---|---|---|---|---|---|---|---|---|
| | After 0.5 min. | After 1 min. | After 2 min. | After 3 min. | After 5 min. | After 7 min. | After 10 min. | After 12 min. | After 15 min. | After 20 min. |
| Form. 20 | 0.0 | 94.5 | 87.3 | 87.3 | 87.3 | 87.3 | 87.3 | 87.3 | 87.3 | 87.3 |
| Form. 21 | 0.0 | * | * | * | 7.7 | 7.7 | 7.7 | 9.7 | 16.3 | 17.0 |
| Form. 22 | 0.0 | * | * | * | 5.5 | 8.2 | 10.9 | 16.4 | 16.4 | 16.4 |
| Form. 23 | 0.0 | * | * | * | 9.0 | 10.8 | 18.1 | | 22.6 | 36.1 |
| Form. 24 | 0.0 | 0.0 | 0.0 | 0.0 | 0.0 | 0.0 | 0.0 | 0.0 | 0.0 | 0.0 |

TABLE 10

Water Separation Rates of Formulations 25-29

| | Water Separation Rate (%) | | | | | | | | | |
|---|---|---|---|---|---|---|---|---|---|---|
| | After 0.5 min. | After 1 min. | After 2 min. | After 3 min. | After 5 min. | After 7 min. | After 10 min. | After 12 min. | After 15 min. | After 20 min. |
| Form. 25 | 0.0 | * | * | * | * | * | * | * | * | 96.3 |
| Form. 26 | 0.0 | * | * | 5.8 | 5.8 | 7.0 | 7.0 | 7.7 | 8.5 | 9.7 |
| Form. 27 | 0.0 | * | * | * | 5.5 | 8.2 | 10.9 | 16.4 | 16.4 | 16.4 |
| Form. 28 | 0.0 | * | * | * | 0.0 | 0.0 | 13.5 | | 20.8 | 27.1 |
| Form. 29 | 0.0 | 0.0 | 0.0 | 0.0 | 0.0 | 0.0 | 0.0 | 0.0 | 0.0 | 0.0 |

The results of the Experiments described above collectively show that the amounts of water, dimethylsilicone oil, dispersion stabilizers I and II in those emulsions that have desirable water dispersion stabilities are as shown in Table 11 below.

TABLE 11

| | Desirable Composition | | | |
|---|---|---|---|---|
| | Dimethyl-silicone oil | Water | Dispersion stabilizer I | Dispersion stabilizer II |
| Experiment 1 | 50 | 50 | 0.5-0.7 | 0.3-0.5 |
| Experiment 2 | 50 | 50 | 0.35-1.4 | 0.15-0.6 |
| Experiment 3 | 10-50 | 50-90 | 0.7 | 0.3 |
| Experiment 4 | 10-70 | 30-90 | 0.14-0.98 | 0.18-0.54 |
| Experiment 5 | 10-70 | 30-90 | 0.14-0.98 | 0.06-0.42 |

Thus, it is seen that those water-in-oil emulsions that contain 100 parts by weight of the liquid silicone rubber material, 0.15 to 3.5 parts by weight of the first ether-modified silicone oil, 0.05 to 2 parts by weight of the second ether-modified silicone oil (the total amount of the dispersion stabilizers: 0.2 to 55 parts by weight) and 10 to 250 parts by weight of water exhibit excellent water dispersion stabilities. It has been confirmed that these optimal amounts of these components that were obtained from the results of the above-described Experiments well agrees with that of the case where a curable liquid silicone rubber material (for example, a combination of polysiloxane having unsaturated aliphatic groups and silicone oil having active hydrogen) was actually used in practice.

Experiment 6

As shown in Table 12 below, various emulsions were prepared in which dispersion stabilizers A to E were blended solely while fixing the ratio between and the total amount of dimethylsilicone oil and water at constant. For each emulsion, the water separation rate was measured. The results are shown in Table 13 below and FIG. 7. The evaluation of each of the emulsions is shown also in Table 12. It should be noted that with Formulation 30, a portion of the oil gelled as in the case of Formulation 5.

TABLE 12

Compositions of Formulations 30-34 and the Results of Evaluation

| | HLB value | Form. 30 | Form. 31 | Form. 32 | Form. 33 | Form. 34 |
|---|---|---|---|---|---|---|
| Dimethyl-silicone oil | | 50 | 50 | 50 | 50 | 50 |
| Water | | 50 | 50 | 50 | 50 | 50 |
| Dispersion stabilizer A | 4 | 1 | | | | |
| Dispersion stabilizer B | 7 | | 1 | | | |
| Dispersion stabilizer C | 10 | | | 1 | | |
| Dispersion stabilizer D | 11 | | | | 1 | |
| Dispersion stabilizer E | 16 | | | | | 1 |
| Evaluation | | X | X | X | X | X |

TABLE 13

Water Separation Rates of Formulations 31-34

| | Water Separation Rate (%) | | | | | | | | | |
|---|---|---|---|---|---|---|---|---|---|---|
| | After 0.5 min. | After 1 min. | After 2 min. | After 3 min. | After 5 min. | After 7 min. | After 10 min. | After 12 min. | After 15 min. | After 20 min. |
| Form. 31 | 0.0 | * | 16.3 | 24.4 | 37.9 | 51.5 | 58.2 | 60.9 | 62.3 | 66.6 |
| Form. 32 | 0.0 | * | 7.0 | 11.9 | 20.3 | 22.8 | 37.9 | 46.0 | 51.5 | 56.9 |
| Form. 33 | 0.0 | 5.5 | 9.8 | 16.4 | 24.6 | 38.3 | 41.0 | 43.8 | 49.2 | 54.7 |
| Form. 34 | 0.0 | 10.8 | 21.7 | 27.1 | 41.7 | 51.5 | 53.1 | 54.2 | 56.9 | 59.6 |

As is clear from the results shown in Table 13 and FIG. 7, it can be understood that with any one of Formulations 30 to 34, an emulsion that satisfies a desirable standard of a water separation rate of 50% or less after 20 minutes cannot be obtained.

Experiment 7

As shown in Table 14 below, various emulsions (Formulations 35-38) were prepared in which the ratio and the total amount of dimethylsilicone oil and water was fixed at constant and the amount of dispersion stabilizer A was fixed at constant, and further, dispersion stabilizers B to E were blended. For each emulsion, the water separation rate was measured. The results are shown in Table 15 below and FIG. 8. The evaluation of each of the emulsions is shown also in Table 14.

As can be understood from the results shown in Table 15 and FIG. 8, it can be understood that Formulations 35 to 37 produce emulsions with a desirable water dispersion stability.

Experiment 8

As shown in Table 16 below, various emulsions (Formulations 39-41) were prepared in which the ratio and the total amount of dimethylsilicone oil and water were fixed at constant and the amount of dispersion stabilizer B was fixed at constant, and further, dispersion stabilizers C to E were blended. For each emulsion, the water separation rate was measured. The results are shown in Table 17 below and FIG. 9. The evaluation of each of the emulsions is shown also in Table 16.

TABLE 14

Compositions of Formulations 35-38 and the Results of Evaluation

|  | HLB value | Form. 35 | Form. 36 | Form. 37 | Form. 38 |
|---|---|---|---|---|---|
| Dimethylsilicone oil |  | 50 | 50 | 50 | 50 |
| Water |  | 50 | 50 | 50 | 50 |
| Dispersion stabilizer A | 4 | 0.5 | 0.5 | 0.5 | 0.5 |
| Dispersion stabilizer B | 7 | 0.5 |  |  |  |
| Dispersion stabilizer C | 10 |  | 0.5 |  |  |
| Dispersion stabilizer D | 11 |  |  | 0.5 |  |
| Dispersion stabilizer E | 16 |  |  |  | 0.5 |
| Evaluation |  | ○ | ○ | ○ | X |

TABLE 16

Compositions of Formulations 39-41 and the Results of Evaluation

|  | HLB value | Form. 39 | Form. 40 | Form. 41 |
|---|---|---|---|---|
| Dimethylsilicone oil |  | 50 | 50 | 50 |
| Water |  | 50 | 50 | 50 |
| Dispersion stabilizer A | 4 |  |  |  |
| Dispersion stabilizer B | 7 | 0.5 | 0.5 | 0.5 |
| Dispersion stabilizer C | 10 | 0.5 |  |  |
| Dispersion stabilizer D | 11 |  | 0.5 |  |
| Dispersion stabilizer E | 16 |  |  | 0.5 |
| Evaluation |  | X | ○ | X |

TABLE 15

Water Separation Rates of Formulations 35-38

| | After 0.5 min. | Water Separation Rate (%) After 1 min. | After 2 min. | After 3 min. | After 5 min. | After 7 min. | After 10 min. | After 12 min. | After 15 min. | After 20 min. |
|---|---|---|---|---|---|---|---|---|---|---|
| Form. 35 | 0.0 | * | * | * | 5.4 | 10.8 | 11.9 | 15.2 | 16.3 | 21.7 |
| Form. 36 | 0.0 | * | * | * | 5.4 | 5.4 | 6.0 | 7.6 | 8.1 | 9.8 |
| Form. 37 | 0.0 | * | * | * | * | 8.2 | 16.4 | 21.9 | 21.9 | 21.9 |
| Form. 38 | 0.0 | 10.8 | 97.5 | 97.5 | 97.5 | 97.5 | 97.5 | 97.5 | 97.5 | 97.5 |

TABLE 17

Water Separation Rates of Formulations 39-41

Water Separation Rate (%)

| | After 0.5 min. | After 1 min. | After 2 min. | After 3 min. | After 5 min. | After 7 min. | After 10 min. | After 12 min. | After 15 min. | After 20 min. |
|---|---|---|---|---|---|---|---|---|---|---|
| Form. 39 | 0.0 | * | 8.1 | 10.3 | 16.3 | 25.5 | 32.5 | 37.9 | 46.0 | 54.2 |
| Form. 40 | 0.0 | 8.1 | 10.8 | 13.5 | 19.0 | 24.4 | 37.9 | 42.3 | 48.8 | 49.8 |
| Form. 41 | 0.0 | 10.8 | 21.7 | 29.8 | 43.3 | 54.2 | 62.3 | 62.3 | 65.0 | 65.0 |

Figure 9:
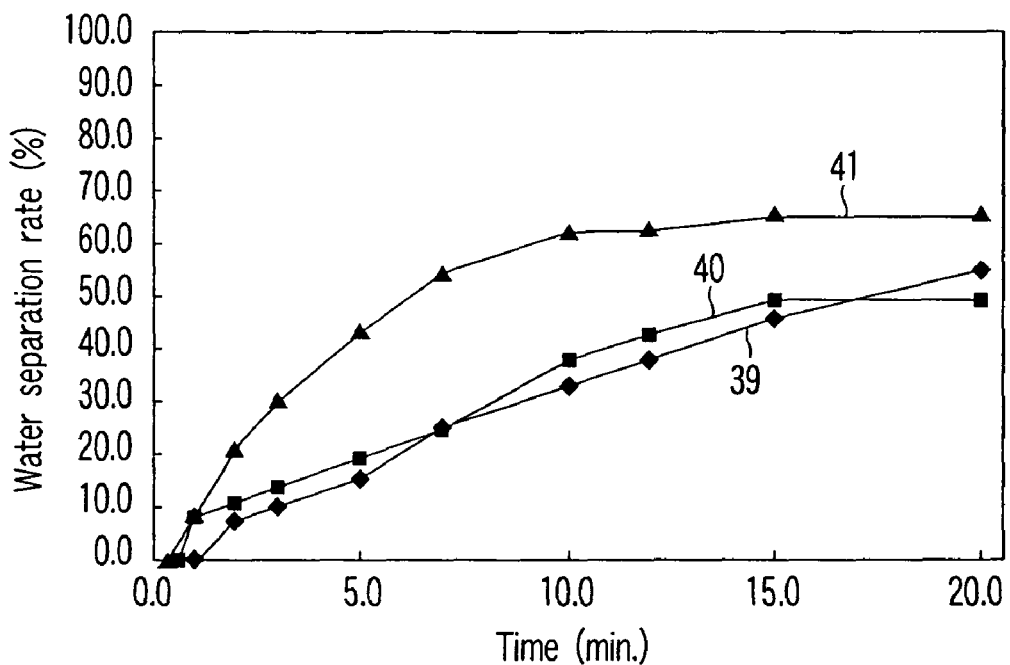
FIG. 9 is a graph showing the water separation ratio of each of emulsions prepared in Experiment 8, which will be explained below in detail.

As can be understood from the results shown in Table 17 and FIG. 9, it can be understood that Formulation 40 produces an emulsion with a desirable water dispersion stability.

Experiment 9

As shown in Table 18 below, various emulsions (Formulations 42-43) were prepared in which the ratio and the total amount of dimethylsilicone oil and water were fixed at constant and the amount of dispersion stabilizer C was fixed at constant, and further, dispersion stabilizers D to E were blended. For each emulsion, the water separation rate was measured. The results are shown in Table 19 below and FIG. 10. The evaluation of each of the emulsions is shown also in Table 18.

TABLE 18

Compositions of Formulations 42-43 and the Results of Evaluation

| | HLB value | Form. 42 | Form. 43 |
|---|---|---|---|
| Dimethyl-silicone oil | | 50 | 50 |
| Water | | 50 | 50 |
| Dispersion stabilizer A | 4 | | |
| Dispersion stabilizer B | 7 | | |
| Dispersion stabilizer C | 10 | 0.5 | 0.5 |
| Dispersion stabilizer D | 11 | 0.5 | |
| Dispersion stabilizer E | 16 | | 0.5 |
| Evaluation | | X | X |

TABLE 19

Water Separation Rates of Formulations 42-43

Water Separation Rate (%)

| | After 0.5 min. | After 1 min. | After 2 min. | After 3 min. | After 5 min. | After 7 min. | After 10 min. | After 12 min. | After 15 min. | After 20 min. |
|---|---|---|---|---|---|---|---|---|---|---|
| Form. 42 | 0.0 | 9.8 | 21.7 | 32.5 | 51.5 | 59.6 | 66.1 | 70.4 | 73.1 | 75.8 |
| Form. 43 | 0.0 | 10.8 | 21.7 | 29.8 | 43.3 | 54.2 | 62.3 | 62.3 | 65.0 | 65.0 |

Figure 10:
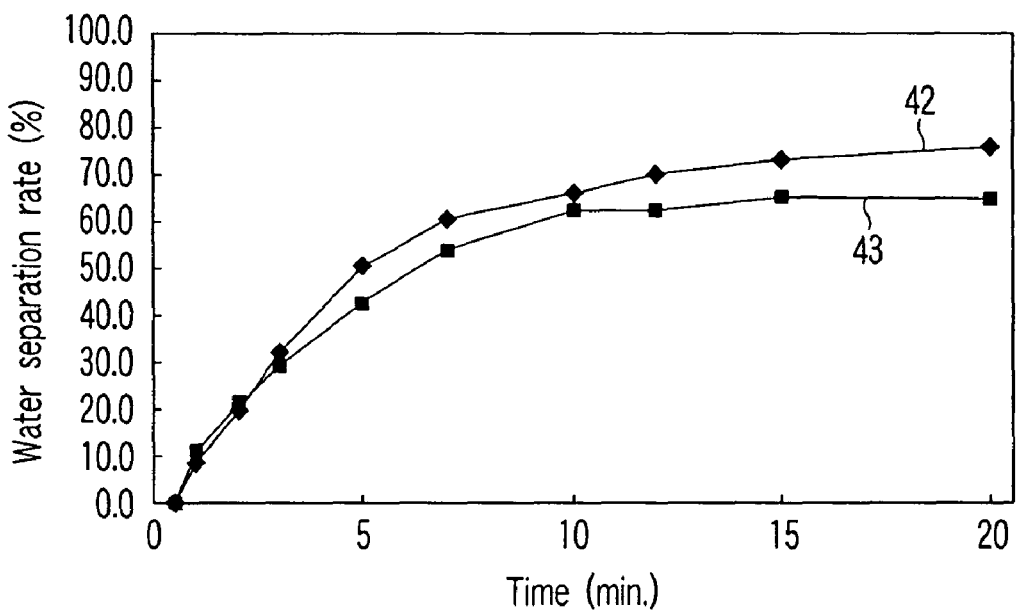
FIG. 10 is a graph showing the water separation ratio of each of emulsions prepared in Experiment 9, which will be explained below in detail.

As can be understood from the results shown in Table 19 and FIG. 10, it can be understood that Formulations 42 to 43 produce emulsions with a desirable water dispersion stability.

From the results obtained above, it can be understood that the dispersion stabilizer is desirably composed of a combination of an ether-modified silicone oil having an HLB value of 7 to 11 (especially from Table 15 and FIG. 8) and another ether-modified silicone oil having an HLB value of 4 to 7 (especially from Table 17 and FIG. 9), in order to produce an emulsion having a desirable water dispersion stability. It can further be understood that the difference in the HLB value between the two ether-modified silicone oils is at least 3 (=7−4).

Example 1

In this Example, a liquid silicone rubber (trade name: KE-1353) available from Shin-Etsu Chemical Co., Ltd was used as a liquid silicone rubber material. This liquid silicone rubber was provided in the form of separate packages of an active hydrogen-containing polysiloxane and a vinyl group-containing polysiloxane, with a catalytic amount of platinum catalyst added to the vinyl group-containing polysiloxane. Hereinafter, the former will be referred to as "silicone rubber precursor A", and the latter will be referred to as "silicone rubber precursor B". The active hydrogen-containing polysiloxane has a structure represented by the above-described formula (2) in which each $R^4$ is a methyl group, whereas the vinyl group-containing polysiloxane has a structure represented by the above-described formula (1) in which each $R^1$ is a vinyl group and each $R^2$ is a methyl group. As the dispersion stabilizers, dispersion stabilizers I and II used in Experiments 1 to 5 described above were used.

A mixture of 0.7 parts by weight of dispersion stabilizer I and 0.3 parts by weight of dispersion stabilizer II premixed in advance was added to 50 parts by weight of the silicone rubber precursor A, and the resultant mixture was stirred for 5 minutes with a hand mixer to have it fully dispersed, thereby preparing a mixture A. On the other hand, a mixture of 0.7 parts by weight of dispersion stabilizer I and 0.3 parts by weight of dispersion stabilizer II premixed in advance was added to 50 parts by weight of the silicone rubber precursor B, and the resultant mixture was stirred for 5 minutes with a hand mixer to have it fully dispersed, thereby preparing a mixture B.

The mixtures A and B thus obtained were mixed together. Then, while stirring the resultant mixture for three minutes with a hand mixer, 10 parts by weight of water was added thereto and the mixture was further stirred for 2 minutes. While stirring the mixture with a hand mixer, 90 parts by weight of water was gradually added, thereby preparing an emulsion.

Figure 11:
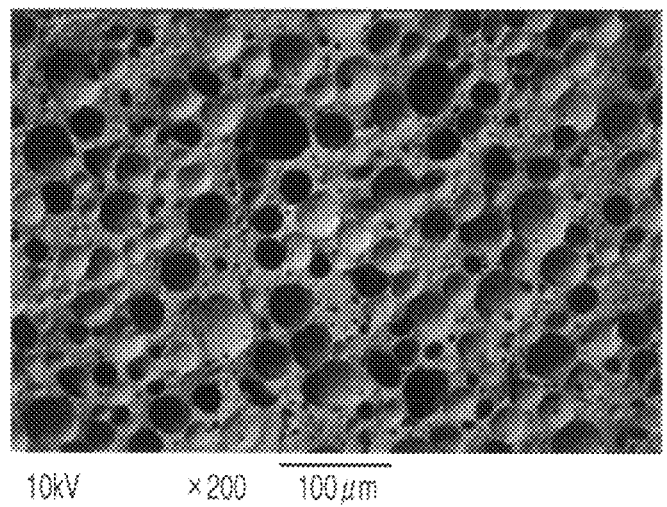
FIG. 11 is an SEM photograph showing a cross section of a silicone elastomer porous material produced in Example 1, which will be explained below in detail.

The emulsion thus obtained was defoamed in a vacuum decompressor to remove the air entrained in the emulsion. Then, it was poured into a compression mold having a depth of 6 mm, and heated using a stamping disk at a temperature of 100° C. for 30 minutes (primary heating) to mold it. The molded body thus obtained (porous material precursor) was heated in an electric furnace at 150° C. for 5 hours (secondary heating) to remove the water. Thus, a silicone elastomer porous material test piece having a rectangular solid portion with a length of 42 mm, a width of 20 mm and a thickness of 6 mm. This test piece was cut in its width direction, and the cross section was observed under an SEM. The observation area was 56517.301 µm². In the observation under the SEM, 52 cells (pores) were detected. The maximum cell diameter was 44.14 µm, the minimum cell diameter was 19.94 µm, and the average cell diameters was 19.94 µm with a standard deviation of 9.35. A photograph of the cross section of the test piece taken under the SEM (magnification of 200 times) is shown in FIG. 11. As shown, the water-in-oil emulsion can produce a closed-cell porous material having very fine cells of even diameter.

Example 2

In this Example, a liquid silicone rubber (trade name: DY35-7002) available from Dow Corning Torey Silicone Ltd. was used as a liquid silicone rubber material. This liquid silicone rubber was provided in the form of separate packages of an active hydrogen-containing polysiloxane and a vinyl group-containing polysiloxane, with a catalytic amount of platinum catalyst added to the vinyl group-containing polysiloxane. Hereinafter, the former will be called silicone rubber precursor A, and the latter will be called silicone rubber precursor B. The active hydrogen-containing polysiloxane has a structure represented by the above-described formula (2) in which each $R^4$ is a methyl group, whereas the vinyl group-containing polysiloxane has a structure represented by the above-described formula (1) in which each $R^1$ is a vinyl group and each $R^2$ is a methyl group. As the dispersion stabilizers, dispersion stabilizers I and II used in Experiments 1 to 5 described above were used.

A mixture of 0.7 parts by weight of dispersion stabilizer I and 0.3 parts by weight of dispersion stabilizer II premixed in advance was added to 50 parts by weight of the silicone rubber precursor A, and the resultant mixture was stirred for 5 minutes with a hand mixer to have it fully dispersed, thereby preparing a mixture A. On the other hand, a mixture of 0.7 parts by weight of dispersion stabilizer I and 0.3 parts by weight of dispersion stabilizer II premixed in advance was added to 50 parts by weight of the silicone rubber precursor B, and the resultant mixture was stirred for 5 minutes with a hand mixer to have it fully dispersed, thereby preparing a mixture B.

The mixtures A and B thus obtained were mixed together. Then, while stirring the resultant mixture for three minutes with a hand mixer, 10 parts by weight of water was added thereto and the mixture was further stirred for 2 minutes. While stirring the mixture with a hand mixer, 90 parts by weight of water was gradually added, thereby preparing an emulsion.

From the emulsion thus obtained, a silicone elastomer porous material test piece was obtained as in Example 1.

Figure 12:
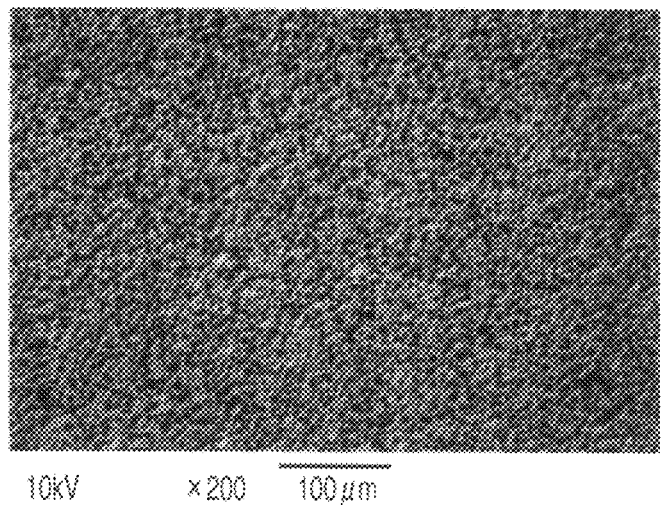
FIG. 12 is an SEM photograph showing a cross section of a silicone elastomer porous material produced in Example 2, which will be explained below in detail.

This test piece was cut in its width direction, and the cross section was observed under an SEM. The observation area was 55656.641 µm². In the observation under the SEM, 686 cells (pores) were detected. The maximum cell diameter was 22.215 µm, the minimum cell diameter was 3.405 µm, and the average cell diameters was 4.657 µm with a standard deviation of 1.306. A photograph of the cross section of the test piece taken under the SEM (magnification of 200 times) is shown in FIG. 12. As shown, the water-in-oil emulsion produces a closed-cell porous material having very fine cells of even diameter.

Comparative Example 1

In this comparative Example, no dispersion stabilizers were used. Thus, 50 parts by weight of silicone rubber precursor A of Example 1 was added to 50 parts by weight of silicone rubber precursor B of Example 1, and the mixture was stirred with a hand mixer for 5 minutes. 10 parts by weight of water was added to the resultant mixture, which was stirred for 2 minutes. Then, 90 parts by weight of water was additionally added to form an emulsion; however, water was separated from the silicone rubber, and the emulsion was not formed. With this mixture, no molding could be done.

Figure 13:
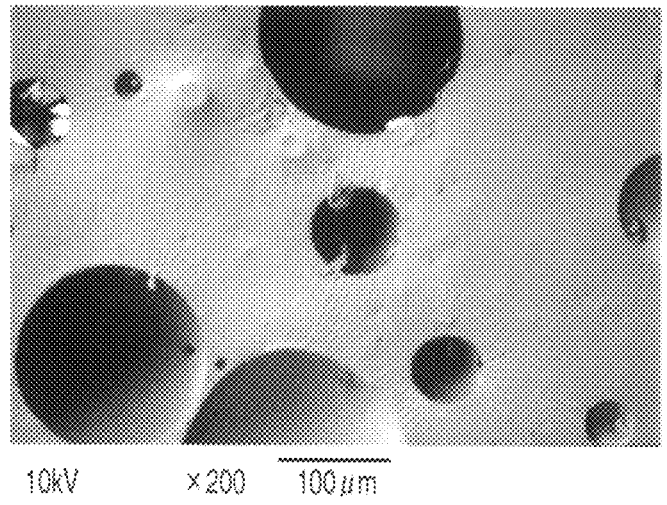
FIG. 13 is an SEM photograph showing a cross section of a formed body produced in Comparative Example 1, which will be explained below in detail.

Then, the amount of additional water was reduced to 40 parts by weight, and an emulsion was tried to form, but the emulsion could not be made as above. However, a test piece could be made under the same conditions as in Example 1. A photograph of the cross section of this test piece taken under the SEM (magnification of 200 times) is shown in FIG. 13.

As can be understood from the results obtained here, it has been concluded that without using a dispersion stabilizer, an emulsion cannot be prepared. Further, the obtained mold body has cells with large diameters, and the diameter varies greatly from a cell to another.

Additional advantages and modifications will readily occur to those skilled in the art. Therefore, the invention in its broader aspects is not limited to the specific details and embodiments shown and described herein. Accordingly, various modifications may be made without departing from the spirit or scope of the general inventive concept as defined by the appended claims and their equivalents.

The invention claimed is:

1. A method of preparing a silicone elastomer porous material, comprising:
   providing a water-in-oil emulsion comprising a liquid silicone rubber material which forms a silicone elastomer upon curing, a silicone oil material which has a surface activation function, and water droplets dispersed in the liquid silicone rubber material;
   subjecting the emulsion to a primary heating, thereby curing the liquid silicone rubber material to form a silicone elastomer and confining the water droplets within the silicone elastomer substantially as they are present in the emulsion; and
   subjecting the silicone elastomer confining the water droplets therein to a secondary heating, thereby evaporating and removing the water droplets from the silicone elastomer, thereby forming the silicone elastomer porous material;
   wherein the silicone oil material has a hydrophilic group; and
   wherein the silicone oil material comprises a mixture of a first ether-modified silicone oil and a second ether-modified silicone oil, and a difference in HLB value between the first ether-modified silicone oil and the second ether-modified silicone oil is at least 3.

2. The method according to claim 1, wherein the primary heating is carried out at 80 to 130° C. for about 5 to 60 minutes.

3. The method according to claim 2, wherein the secondary heating is carried out at 70 to 300° C. for about 1 to 24 hours.

4. The method according to claim 1, wherein the liquid silicone rubber material is an addition reaction curing one.

5. The method according to claim 4, wherein the liquid silicone rubber material includes a polysiloxane having an unsaturated aliphatic group and a polysiloxane having active hydrogen.

6. The method according to claim 5, wherein the unsaturated aliphatic group is a vinyl group.

7. The method according to claim 1, wherein the first ether-modified silicone oil has an HLB value of 7 to 11 and the second ether-modified silicone oil has an HLB value of 4 to 7.

8. The method according to claim 1, wherein the emulsion composition comprises 100 parts by weight of the liquid silicone rubber material, 0.2 to 5.5 parts by weight of the silicone oil material, and 10 to 250 parts by weight of the water droplets.

9. The method according to claim 1, wherein the emulsion composition comprises 100 parts by weight of the liquid silicone rubber material, 0.15 to 3.5 parts by weight of the first silicone oil, 0.05 to 2 parts by weight of the second silicone oil, and 10 to 250 parts by weight of the water droplets.

10. The method according to claim 1, comprising 100 parts by weight of the liquid silicone rubber material, 0.15 to 3.5 parts by weight of the first ether-modified silicone oil, 0.05 to 2 parts by weight of the second ether-modified silicone oil, and 10 to 250 parts by weight of the water droplets.

11. The method according to claim 1, wherein the water droplets has an average diameter of 1 to 50 μm.

* * * * *